(12) United States Patent
Venkatraman

(10) Patent No.: US 8,077,033 B2
(45) Date of Patent: Dec. 13, 2011

(54) DISASTER VULNERABILITY ASSESSMENT IN BUILDINGS

(75) Inventor: Balaji Venkatraman, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 342 days.

(21) Appl. No.: 12/334,064

(22) Filed: Dec. 12, 2008

(65) Prior Publication Data
US 2010/0148953 A1 Jun. 17, 2010

(51) Int. Cl.
*G08B 21/00* (2006.01)
(52) U.S. Cl. .............. 340/540; 340/573.1; 340/539.11
(58) Field of Classification Search .......... 340/540, 340/539.1, 521, 825.36, 573.1, 573.4, 6.1, 340/539.11, 539.13
See application file for complete search history.

(56) References Cited

U.S. PATENT DOCUMENTS

| | | | |
|---|---|---|---|
| 6,348,860 B1 * | 2/2002 | Davis et al. .................. | 340/525 |
| 6,529,128 B2 | 3/2003 | Weng | |
| 6,529,230 B1 | 3/2003 | Chong | |
| 6,675,091 B2 * | 1/2004 | Navab .......................... | 701/207 |
| 6,956,474 B2 * | 10/2005 | Jakubowski ................ | 340/539.1 |
| 7,468,658 B2 * | 12/2008 | Bouressa ..................... | 340/539.1 |
| 7,852,209 B2 * | 12/2010 | Shrode ........................ | 340/539.13 |

OTHER PUBLICATIONS

"Firefighting in the United States," from Wikipedia [printed on Aug. 5, 2011] 5 pages; http://en.wikipedia.org/wiki/Firefighting_in_the_United_States.
"Firefighting Worldwide," from Wikipedia [printed on Aug. 5, 2011] 12 pages; http://en.wikipedia.org/wiki/Firefighting_worldwide.
"The Fire Service and Higher Education; A Blueprint for the 21st Century," Fire Science Coordinators Meeting, National Fire Academy, Aug. 7-8, 1998, 12 pages http://www.usfa.dhs.gov/downloads/pdf/rpt6.pdf.
"Workplace Safety for People with Disabilities," NFPA Center for High Risk Outreach, National Fire Protection Association, [printed on Aug. 5, 2011], 2 pages, http://www.nfpa.org/assets/files//PDF/Public%20Education/Workplacedisabilities.pdf.

* cited by examiner

*Primary Examiner* — Toan N Pham
(74) *Attorney, Agent, or Firm* — Patent Capital Group

(57) ABSTRACT

The number and identities of people in a building along with personal data that is useful in disaster response planning are determined from a database receiving information from the building's security access card readers and from user information extracted from wireless network access points. This information is used in the event of a disaster alarm to quickly compute vulnerability indicia for each of several locations in a building and each of several buildings in a group.

20 Claims, 5 Drawing Sheets

Solution Context Diagram

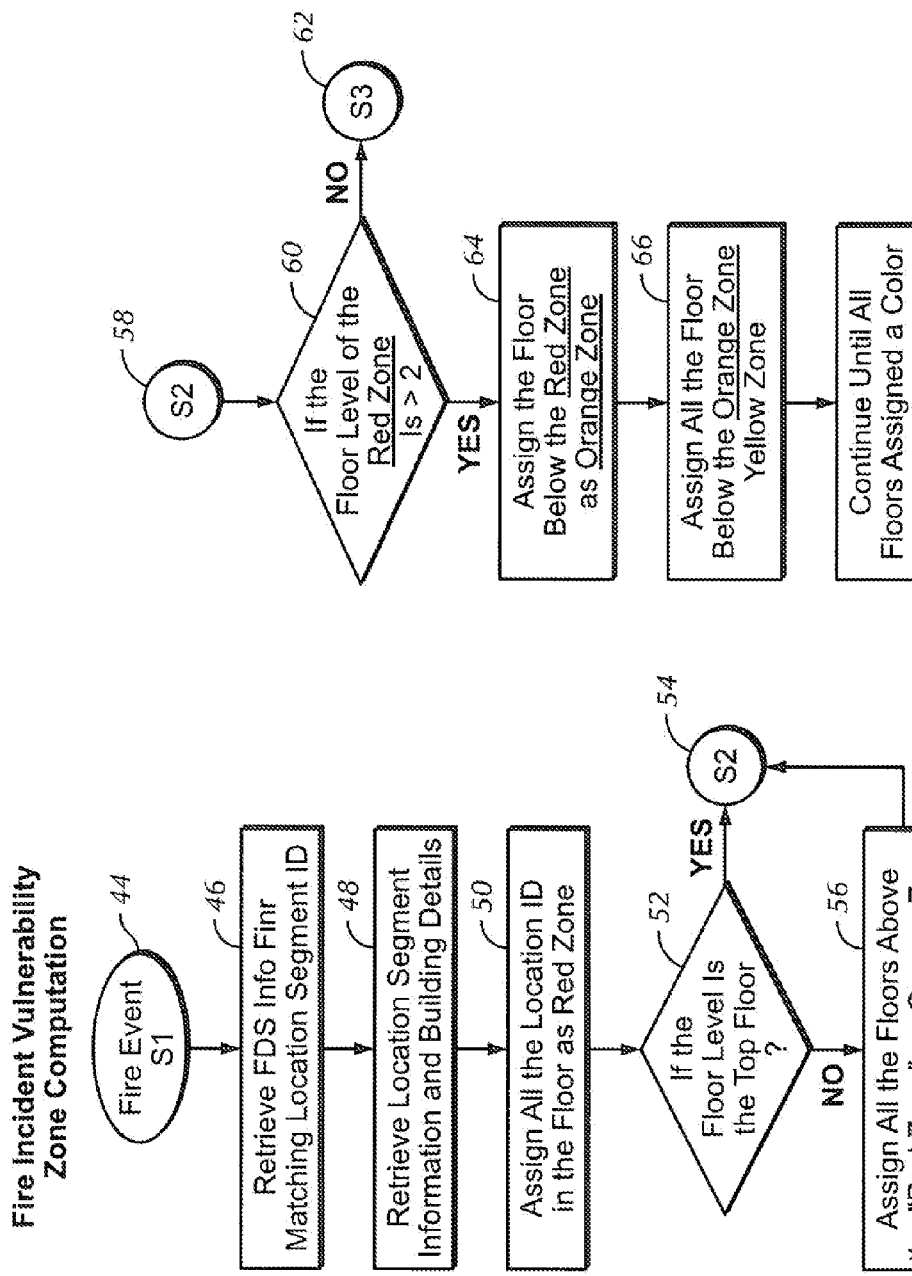

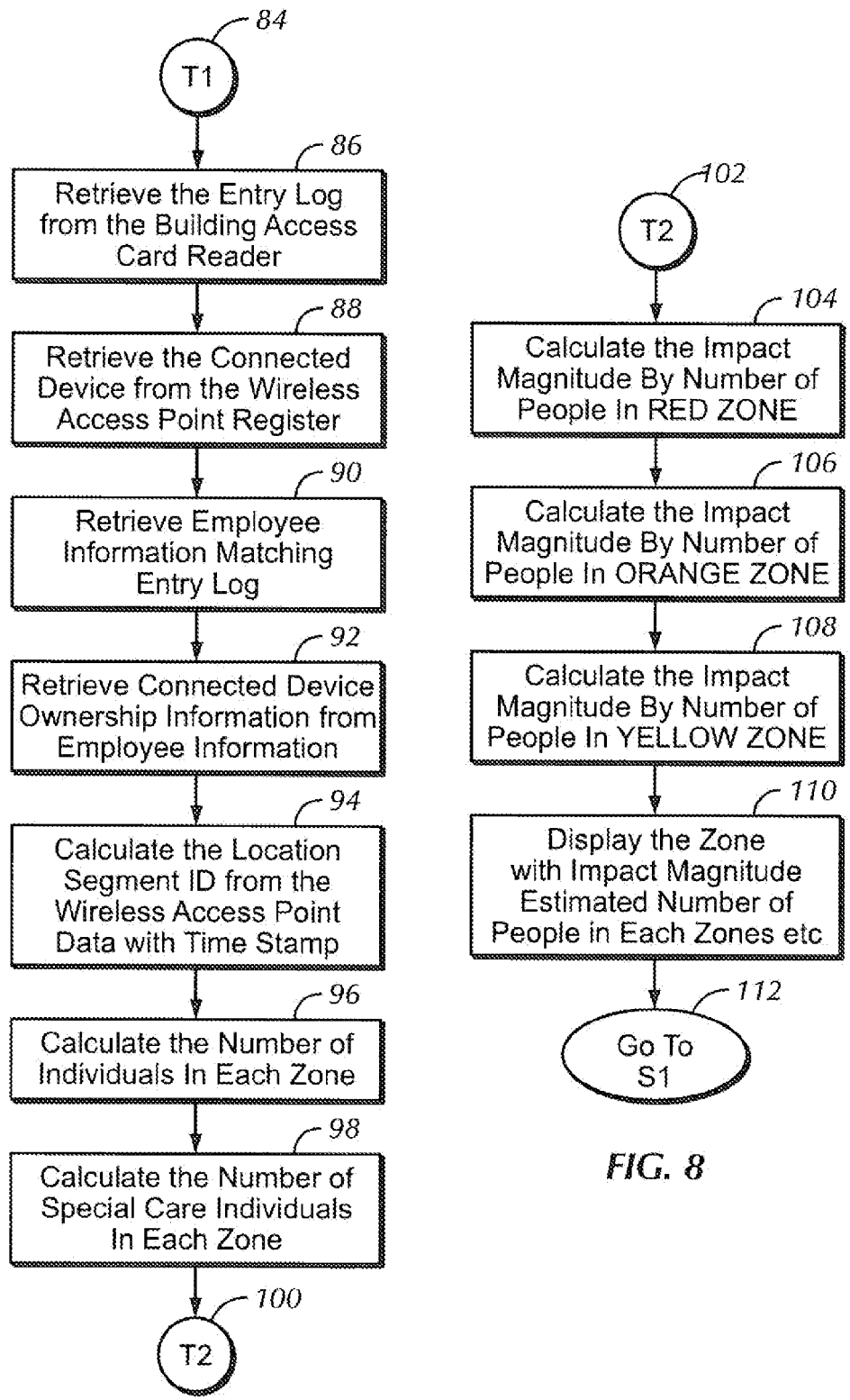

DISASTER VULNERABILITY ASSESSMENT IN BUILDINGS

FIELD OF THE INVENTION

The present application relates generally to disaster vulnerability assessments in buildings, particularly buildings with security card readers and/or wireless network access points.

BACKGROUND OF THE INVENTION

Fires and other natural or man-made disasters, particularly when they affect large buildings with a fluctuating and diverse occupancy, pose challenges in resource allocation. To combat a large fire in one or more corporate buildings, for example, firefighters must decide which building or buildings to attend to first. Currently, however, they must make these decisions without knowing information that can be of importance in the firefighting triage. For instance, a fast decision must be made in how to allocate disaster response resources without knowing whether a particular building holds many people or few and without knowing whether special needs people such as physically challenged workers and pregnant workers might be in any particular building.

BRIEF DESCRIPTION OF THE DRAWINGS

The details of non-limiting embodiments, both as to its structure and operation, can best be understood in reference to the accompanying drawings, in which like reference numerals refer to like parts, and in which:

FIGS. 3-8 are flow charts of example fire vulnerability assessment logic.

DESCRIPTION OF EXAMPLE EMBODIMENTS

OVERVIEW

A method includes receiving indication of a disaster such as a fire in at least one building. The method also includes, in response to the indication, accessing personnel information of people in the building. Identities of people in the building are indicated by security card readers and/or user identities associated with computers communicating with wireless network access points in the building. Based on the personnel indication, disaster vulnerability indices are generated.

In some embodiments the identities of people in the building are indicated by both the security card reader and an identity of the user computer communicating with the wireless network access points. The index further may be based on floor location, the number of exits on a floor of the building, a zone multiplier, and a number of people in an affected zone with special needs such as physical impairment. In an example, the index can be determined using:

Index=$[NZL(1/(S-1))]+P^Z$, where N=number of people in a zone, L=zone multiplier, L=floor multiplier, S=numbers of available exits from a floor, and P=number of people with special needs.

In another example, a system includes wireless network access points, building access device records, and disaster sensors. A processor uses information from the access points, access device records, and sensors to provide disaster vulnerability assessments.

In another example, an apparatus includes a computer processor and a computer readable medium accessible to the processor for developing fire vulnerability assessments with various categories of vulnerability zones based oh real time sensing of people within zones affected by a disaster.

DESCRIPTION OF EXAMPLE EMBODIMENTS

Figure 1:
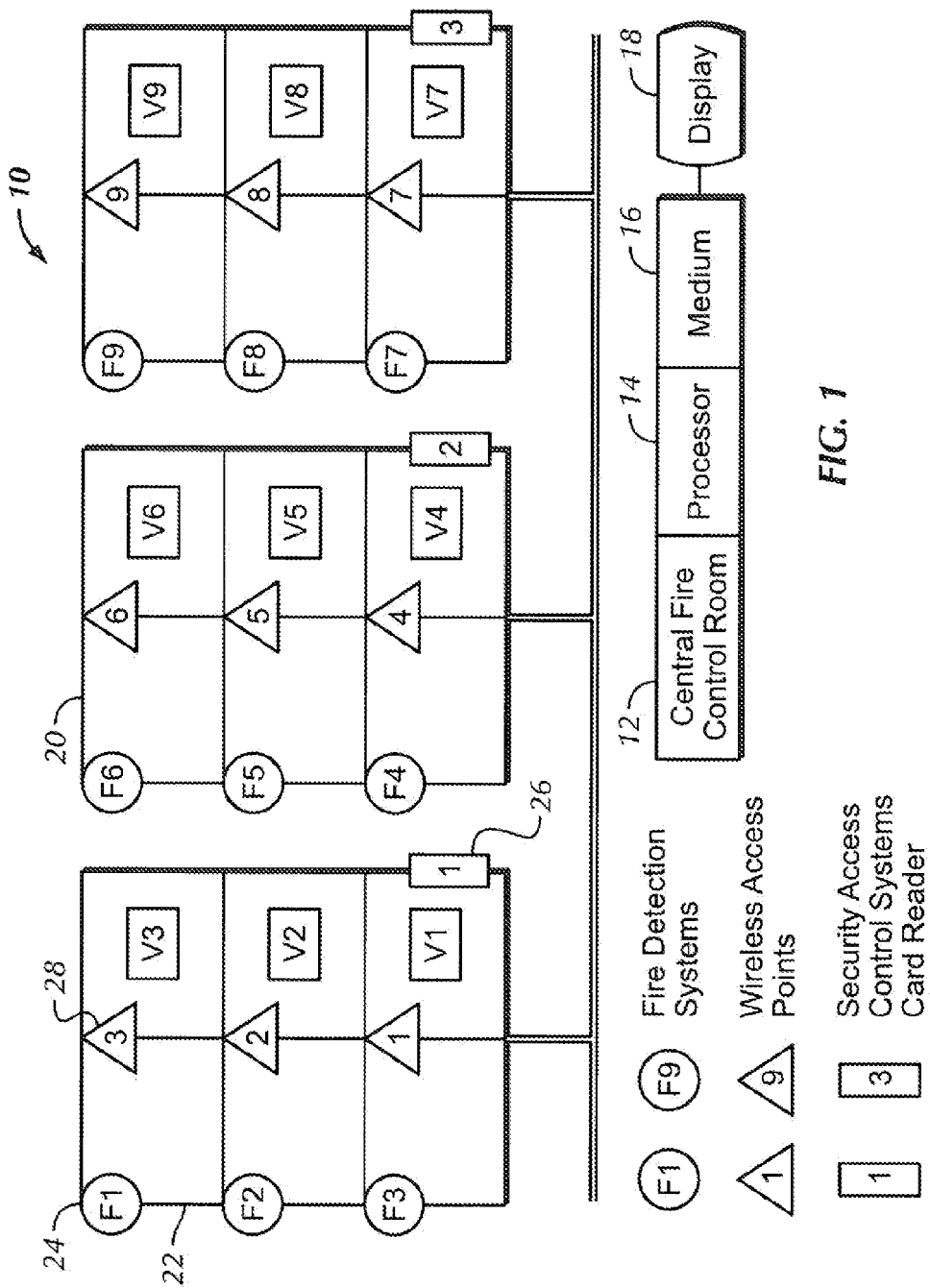
FIG. 1 is a schematic diagram of an example environment for using present principles.

Referring initially to FIG. 1, a system is shown, generally designated 10, which includes a central fire control room 12 or other suitable location that can house one or more vulnerability assessment processors 14 accessing one or more computer readable media 16 such as disk storage, solid state storage, etc. that may contain logic described herein and executable by the processor 14. The media 16 may embody a central database discussed further below. Among other things, the processor 14 may output visible and/or aural indicia of vulnerability assessments on one or more displays 18 such as video monitors, printers, speakers, alarms, etc.

The vulnerability assessments are for respective multiple locations in one or more buildings having one or more floors. By way of non-limiting example, a corporate or academic campus may consist of several multi-floor buildings, some or all of which potentially can be effected by a disaster such as a large fire or flooding or earthquake, and the purpose of the system 10 is to provide disaster managers with assessments of the vulnerabilities of various locations within the campus to the disaster. In this way, managers can more effectively deploy responders.

FIG. 1 shows a simplified group of buildings 20 in communication with the processor 14. The group of buildings 20 may be a group of academic buildings, a group of hospital buildings, a group of transportation buildings, a group of office buildings, a datacenter, etc.

In the simplified example shown, three buildings 20 each have three vertical floors 22, with each floor 22 being assigned a unique zone identification. It is to be understood that each floor 22 may be further divided into sub-zones if desired. Each zone (e.g., each floor 22) can be associated in a central database embodied by, e.g., the media 16 not only with a respective logical ID but also with exit information (e.g., number of exits free and number blocked, etc.), as well as other floor information such as accessibility qualifiers (e.g., "no elevator capability, some people may require assistance entering and exiting").

In any case, each zone in some embodiments has its own disaster sensor 24 with associated sensor ID, with the sensor IDs being correlated with zone IDs. In one example, each sensor 24 is a fire sensor such as but not limited to a smoke or heat sensor. Thus, the example shown assumes that the disaster being analyzed is a fire, it being understood that present principles apply to other disasters and appropriate sensors (e.g., earthquake sensors for earthquakes, water sensors for floods, etc.) The sensors 24 communicate with the processor 14 over, e.g., a wired or wireless Internet Protocol (IP) network.

Additionally, each building 22 may have an associated controlled entry device 26 such as but not limited a security card reader that unlocks entry doors only upon presentation by a person of an authorized security card. Each entry device 26 has a unique entry device ID and each entry device 26 communicates with the processor 14.

Further, some or, more preferably, all zones have one or more associated wireless network access points 28 each of which is associated with a unique access point ID and each of which communicates with the processor 14. The access points 28 provide network access to nearby wireless computing devices such as laptop computers. Each access point 28 may be embodied by, e.g., a wireless router or other appropriate network access point.

In addition to or as an alternative to the access points 28, each zone can be provided with a respective video camera 29 each of which is associated with a unique camera ID and each of which communicates with the processor 14.

With the above disclosure in mind, it may now be appreciated that the access points 28, cameras 29 (if provided), and entry devices 26 provide information that can indicate the number and identities of people in the respective buildings and floors. For example, an entry device 26 can generate information of which access cards or other entry devices have passed in and out of the respective building 20, and each access card or other entry device is uniquely associated with a person. Personal information of the person, including age, physical capabilities, sex, etc. may be maintained in the central database so that information from the entry devices 26 can be used to generate indications of which specific people (along with associated personal information) are present in any particular building.

Likewise, each access point 28 can generate information representative of the ID (e.g., media access control (MAC) address) of computers communicating with the access point 28, and the computers IDs may be correlated in the central database with respective users. In this way, the identities of people in each zone, e.g., on each floor 22, can be determined using information from the access points 28.

Furthermore, images from the cameras 29 can be analyzed using image analysis principles known in the art to identify personal traits of people being imaged in the zone. For example, using image analysis it can be determined whether anyone in the zone is in a wheelchair. In this way, relevant traits of people in each zone can be determined using information from the cameras 29.

Figure 2:
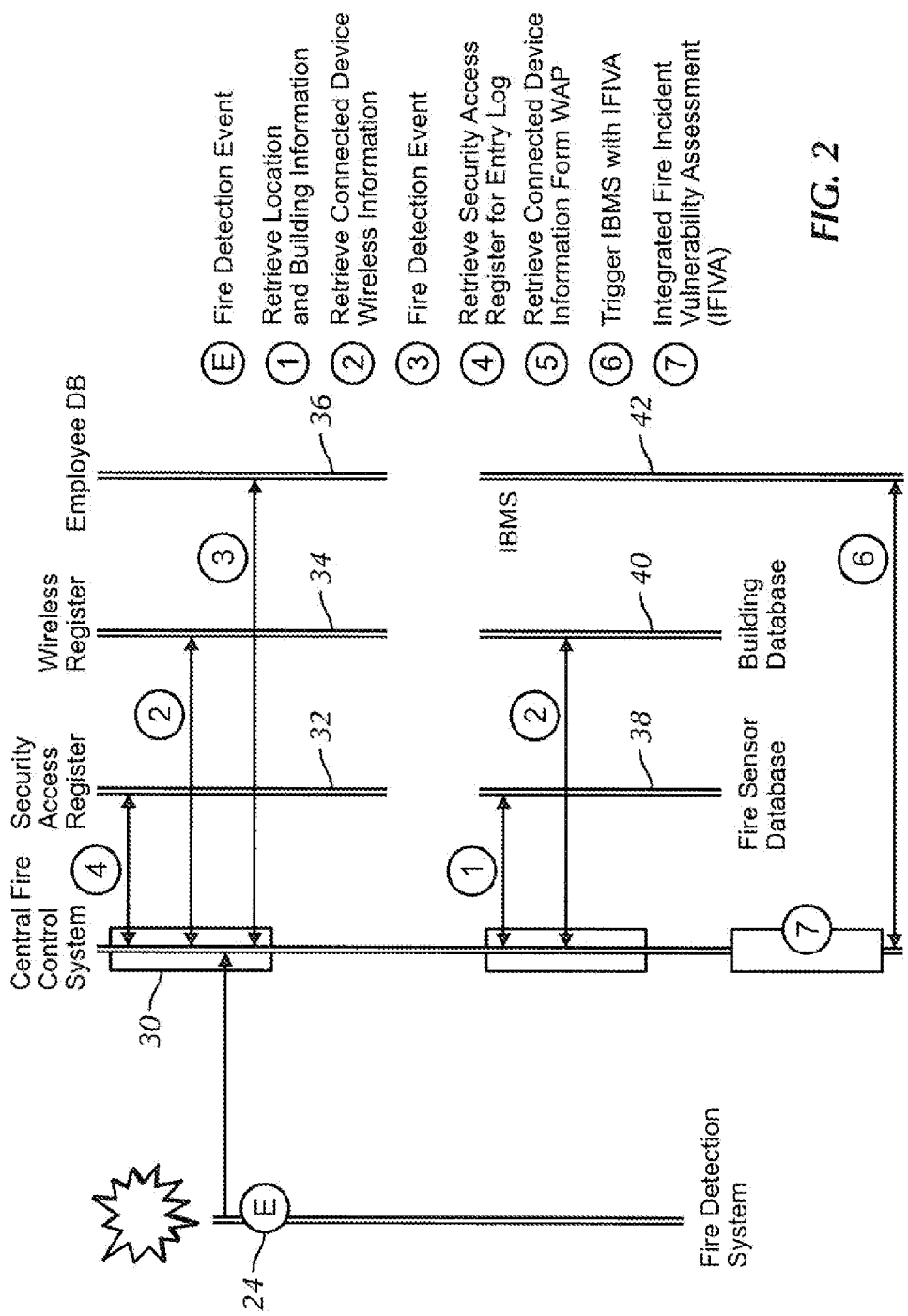
FIG. 2 is a sequence diagram of information exchange to support fire vulnerability assessment.

FIG. 2 shows that the example fire detection system including the sensor 24 communicate with a central fire control system 30 that may be embodied by the processor 14 and media 16 shown in FIG. 1. The control system 30 may communicate with various data structures including databases and registers that may be maintained on, e.g., the media 16 shown in FIG. 1. For example, the control system 30 may communicate with an access register 32 that records which access cards have entered the respective buildings associated with the access devices 26. The control system 30 may also communicate with a wireless register 34 that records which wireless computing devices are communicating with respective access points 28. The control system 30 may also communicate with a personnel database 36 that associates wireless computing devices and access cards to respective people, along with personal information as noted above for each person.

Furthermore, the control system 30 may communicate with a sensor database 38 that correlates sensor IDs with sensor locations in buildings. The above-mentioned building information may be contained in a building database 40. Upon detection of a fire, the control system 30 may invoke an integrated building management system (IBMS) routine 42 in accordance with logic below to provide a zone-by-zone vulnerability assessment on, e.g., the display 18 shown in FIG. 1.

With the above description of FIG. 2, it now may be appreciated that when a fire is detected, the control system 30 retrieves location/building information associated with the ID of the reporting sensor. It then retrieves information using access device 26 and access point 28 information and correlations from the various data structures shown in FIG. 2 to ascertain which people are in affected areas, and which, if any, of the people have special needs, e.g., are young, or are pregnant, or are physically handicapped, etc. As set forth further below, the control system 30 uses this information to generate zone-by-zone vulnerability assessments.

FIGS. 3-8 provide details of an example implementation of the above-discussed logic. A fire event is sensed at state S1, labelled 44 in FIG. 3. In response, at block 46 the ID of the reporting sensor(s) is retrieved and at block 48 matching building location and building information is retrieved. Thus, after block 48 the control system 30 knows the building(s) and floor(s) whose sensor(s) have reported fires, along with relevant building information, e.g., "one entrance blocked", "one elevator out of commission", etc.

At block 50, zones, e.g., floors, determined to have fires on them are assigned a high vulnerability code. Fir simplicity, the present example uses the color red as the highest vulnerability code, followed, in decreasing order of severity, orange, then yellow.

At decision diamond 52, for each "red" zone it is determined whether the "red" zone is the top floor of the building using the building information retrieved at block 48. If it is, the logic moves to state 54 to enter FIG. 4 at correlating state 58. If the "red" floor is not the top floor, the logic flow to block 56 to assign all floors above the "red" floor the next highest vulnerability code, in the example shown, "orange". The logic then flows to state 54 and thence to state 58 in FIG. 4.

From state 58 in FIG. 4 the logic moves to decision diamond 60 to determine whether the "red" floor is higher than the second floor of the building, i.e., whether the "red" floor is the third floor or higher. If it is not the logic flows to state 62 to enter FIG. 5 but otherwise the logic flows to block 64 to assign the next floor down the next highest vulnerability code, in the example shown, "orange". Then, at block 66 floors below the "orange" floor are assigned the lowest vulnerability code, in the example shown, "yellow".

Figure 5:
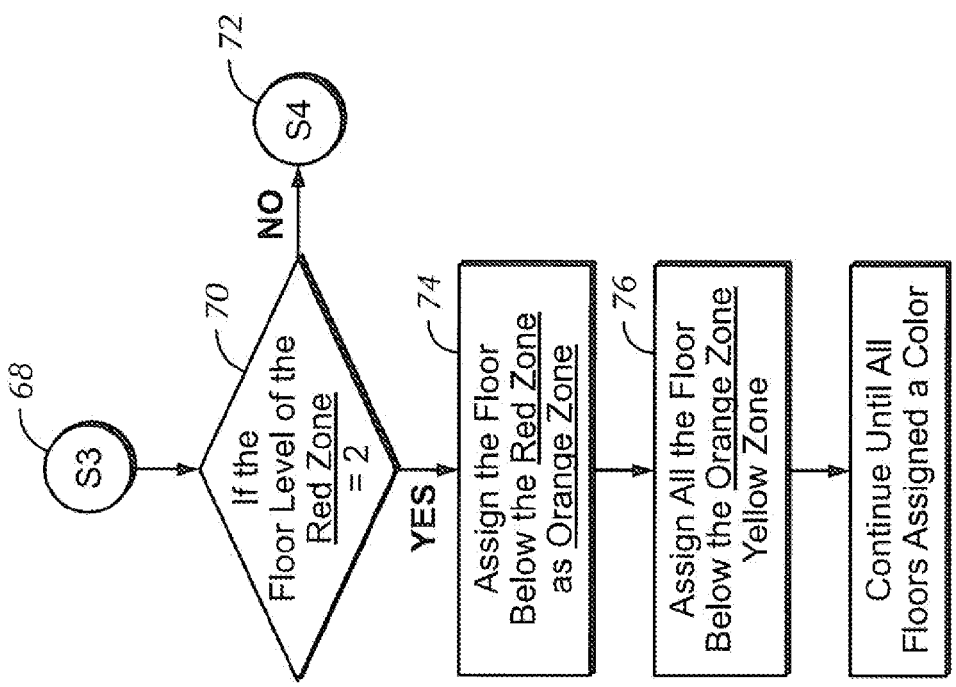

From state 62 of FIG. 4 the logic enters FIG. 5 at state 68 and flows to decision diamond 70 to determine whether the "red" floor is the second floor of the building. If it is not the logic departs FIG. 5 at state 72 but otherwise the logic flows to block 74 to assign the next floor down (i.e., the first floor of the building) the next highest vulnerability code, in the example shown, "orange". Then, at block 76 floors below the "orange" floor (i.e., basement floors) are assigned the lowest vulnerability code, in the example shown, "yellow".

Figure 6:
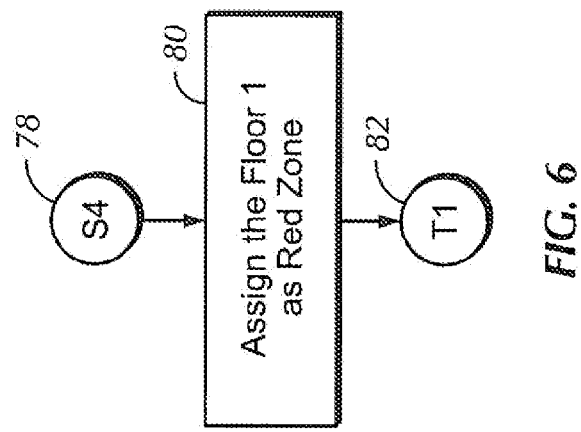

From state 72 of FIG. 5 the logic enters FIG. 6 at state 78 and flows to block 80 to assign the first floor the code "orange". The logic leaves FIG. 6 at state 82.

From state 82 of FIG. 6 the logic enters FIG. 7 at, state 84 and flows to block 86 to retrieve entry information from the entry device 26 of the affected building 20. Also, at block 88 information is retrieved as to which wireless devices are connected to which access points 28 in the affected building. The personnel information associated with entry log data is retrieved at block 90 and the user information associated with connected device information is retrieved at block 92.

At block 94 location segment ID is determined using the information from the access points 28 with time stamps indicating time(s) of connection of the connected devices determined at block 88. The number of individuals in each affected zone is determined at block 96 using the preceding information and using the personal information associated with each person, the number of "special needs" people is determined for each affected zone at block 98. The logic of FIG. 7 ends at state 100.

Entering state 102 of FIG. 8 from state 100 of FIG. 7, the logic flows to block 104 to calculate an impact magnitude of each affected zone as follows. In the non-limiting example shown, the total number of people in each red zone is multiplied by a red zone multiplier (e.g., ten) and by a floor multiplier (e.g., the level of the associated floor above the ground). The resulting product is then multiplied by the inverse of the difference between the number of exits in the floor and unity, it being understood that each floor is assumed to have at least two exits. This total product is then added to the number of special needs people in the zone raised to an exponent defined by the zone multiplier.

The above may be reflected in the below equation:

$$\text{Fire Impact Magnitude} = [NZL(1/(S-1))] + P^Z,$$

where N=number of people in the zone, Z=zone multiplier, L=level (floor) multiplier, S=numbers of exits from the floor, in some embodiments excluding elevators, and P=number of people with special needs on the floor.

The above is repeated at block 106 for "orange" floors using a zone multiplier of, e.g., three and at block 108 for "yellow" floors using a zone multiplier of, e.g., unity. At block 110 each zone with associated impact magnitude is displayed on, e.g., the display 18 in FIG. 1, and the logic can revert at state 112 to the beginning of the logic flow if desired.

More generally, a vulnerability index may be thought of as a human-referenced measure of the vulnerability of an area to human injury or death in the event of a disaster.

While the particular FIRE VULNERABILITY ASSESSMENT IN BUILDINGS is herein shown and described in detail, it is to be understood that the subject matter which is encompassed by the present invention is limited only by the claims.

What is claimed is:

1. A method comprising:
   receiving an indication of a disaster in at least one building;
   accessing personnel information of people in the building, wherein the personnel information is collected from an entry device associated with the building, and wherein the entry device maintains user identity information indicative of users entering and exiting the building; and
   generating at least one disaster vulnerability index.

2. The method of claim 1, wherein identities of people in the building are indicated by both a security card reader and an identity of a user computer communicating with at least one wireless network access point in the building.

3. The method of claim 1, wherein the index is further based at least in part on floor location.

4. The method of claim 1, wherein information related to people in the building is derived from information from at least one video camera.

5. The method of claim 1, wherein the building is divided into zones that are associated with a database, which includes exit information for each of the zones.

6. The method of claim 1, wherein the index is based at least in part on a number of people in an affected zone of the building with special needs.

7. The method of claim 1, wherein the index is determined using:

$$\text{Index} = [NZL(1/(S-1))] + P^Z,$$

where N=number of people in a zone, Z=zone multiplier, L=floor multiplier, S=numbers of available exits from a floor, and P=number of people with special needs.

8. A system, comprising:
   wireless network access points;
   building access device records;
   disaster sensors; and
   at least one processor using information from the access points, access device records, and sensors to provide disaster vulnerability assessments, wherein at least part of the disaster vulnerability assessments includes accessing personnel information of people in a building, wherein the personnel information is collected from an entry device associated with the building, and wherein the entry device maintains user identity information indicative of users entering and exiting the building.

9. The system of claim 8, wherein identities of people in the building affected by a disaster are indicated using information from both the wireless network access points and the building access device records.

10. The system of claim 9, wherein the disaster vulnerability assessment is further based at least in part on floor location associated with a disaster.

11. The system of claim 9, wherein the disaster vulnerability assessment is based at least in part on number of exits on a floor of the building.

12. The system of claim 9, wherein the disaster vulnerability assessment is based at least in part on a zone multiplier.

13. The system of claim 9, wherein the disaster vulnerability assessment is based at least in part on a number of people in an affected zone with special needs.

14. The system of claim 9, wherein the disaster vulnerability assessment is determined using $$\text{Disaster vulnerability assessment} = [NZL(1/(S-1))] + P^Z,$$

where N=number of people in a zone, Z=zone multiplier, L=floor multiplier, S=numbers of available exits from a floor, and P=number of people with special needs.

15. An apparatus, comprising:
    at least one computer processor; and
    at least one computer readable medium accessible to the processor for:
       developing disaster vulnerability assessments with various categories of vulnerability zones in a building based at least in part on real time sensing of people within zones affected by a disaster, wherein at least part of the disaster vulnerability assessments includes accessing personnel information of the people in the building, wherein the personnel information is collected from an entry device associated with the building, and wherein the entry device maintains user identity information indicative of users entering and exiting the building.

16. The apparatus of claim 15, wherein identities of people in the building affected by the disaster are indicated using information from wireless network access points and building access device records.

17. The apparatus of claim 16, wherein the disaster vulnerability assessment is further based at least in part on floor location associated with a disaster.

18. The apparatus of claim 16, wherein the disaster vulnerability assessment is based at least in part on number of exits on a floor of the building.

19. The apparatus of claim 16, wherein the disaster vulnerability assessment is based at least in part on a number of people in an affected zone with special needs.

20. The apparatus of claim 15, wherein the disaster vulnerability assessment is determined using:

$$\text{Disaster vulnerability assessment} = [NZL(1/(S-1))] + P^Z,$$

where N=number of people in zone, Z=zone multiplier, L=floor multiplier, S=numbers of available exits from a floor, and P=number of people with special needs.

* * * * *